US008458719B2

(12) United States Patent
Wellerdiek

(10) Patent No.: US 8,458,719 B2
(45) Date of Patent: Jun. 4, 2013

(54) STORAGE MANAGEMENT IN A DATA PROCESSING SYSTEM

(75) Inventor: Dieter Wellerdiek, Ammerbuch (DE)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/967,680

(22) Filed: Dec. 14, 2010

(65) Prior Publication Data

US 2011/0154357 A1    Jun. 23, 2011

(30) Foreign Application Priority Data

Dec. 17, 2009    (EP) .................................... 09179674

(51) Int. Cl.
*G06F 9/46*    (2006.01)
*G06F 9/50*    (2006.01)

(52) U.S. Cl.
CPC .................................... *G06F 9/505* (2013.01)
USPC ......................................... 718/105; 718/104

(58) Field of Classification Search
None
See application file for complete search history.

(56) References Cited

U.S. PATENT DOCUMENTS

| | | | |
|---|---|---|---|
| 6,760,910 B2 | 7/2004 | Eilert et al. | |
| 7,062,628 B2 | 6/2006 | Amano | |
| 7,441,096 B2 * | 10/2008 | Kitamura | 711/203 |
| 7,490,207 B2 * | 2/2009 | Amarendran et al. | 711/165 |
| 7,600,229 B1 * | 10/2009 | Shmuylovich et al. | 718/105 |
| 7,702,865 B2 * | 4/2010 | Yamakawa et al. | 711/162 |
| 7,941,625 B2 * | 5/2011 | Sakaguchi et al. | 711/165 |
| 7,979,604 B2 * | 7/2011 | Kaneda | 710/41 |
| 2004/0025162 A1 * | 2/2004 | Fisk | 718/105 |
| 2006/0236056 A1 * | 10/2006 | Nagata | 711/165 |
| 2007/0055840 A1 * | 3/2007 | Yamamoto et al. | 711/165 |
| 2007/0118710 A1 | 5/2007 | Yamakawa et al. | |
| 2007/0283107 A1 * | 12/2007 | Ozaki et al. | 711/154 |
| 2008/0082777 A1 * | 4/2008 | Sakaguchi et al. | 711/170 |
| 2008/0270696 A1 * | 10/2008 | Murayama et al. | 711/114 |
| 2009/0019097 A1 | 1/2009 | Prasad et al. | |
| 2009/0138884 A1 * | 5/2009 | Kakeda et al. | 718/104 |
| 2010/0125715 A1 * | 5/2010 | Takamatsu et al. | 711/170 |
| 2011/0125890 A1 * | 5/2011 | Sakaguchi et al. | 709/223 |
| 2011/0154352 A1 * | 6/2011 | Desota et al. | 718/104 |
| 2011/0252213 A1 * | 10/2011 | Shibayama et al. | 711/165 |
| 2012/0137099 A1 * | 5/2012 | Shibayama et al. | 711/165 |

* cited by examiner

*Primary Examiner* — Emerson Puente
*Assistant Examiner* — Mehran Kamran
(74) *Attorney, Agent, or Firm* — Matthew J. Bussan

(57) ABSTRACT

The invention relates to a method for storage management in a data processing system having a plurality of storage devices with different performance attributes and a workload. The workload is being associated with respective sets of data blocks to be stored in said plurality of storage devices. The method comprises the steps of dynamically determining performance requirements of the workload and dynamically determining performance attributes of the storage devices. The method further comprises the step of allocating data blocks to the storage devices depending on the performance requirements of the associated workload and the performance attributes of the storage devices.

16 Claims, 4 Drawing Sheets

STORAGE MANAGEMENT IN A DATA PROCESSING SYSTEM

BACKGROUND

1. Field of the Invention

The present invention relates to a data storage subsystem also known as an auxiliary storage manager. The auxiliary storage manager is responsible for moving frames from central storage to auxiliary storage (AUX). The auxiliary storage is usually a file on a direct access storage devices (DASD) or hard disk.

2. Description of the Related Art

One example of implementation of such a subsystem is in the IBM® operating system z/OS®. The IBM® operating system z/OS® is a virtual storage system which comprises mapping virtual storage pages to frames in central storage or slots in auxiliary storage. A virtual storage system, such as the IBM® operating system z/OS®, only loads those portions of a program that are needed for the momentary operation of the program into central storage. The inactive pieces of the program, however, are kept in auxiliary storage. An auxiliary storage manager is responsible for moving storage pages or data blocks from the central storage to the auxiliary storage when not currently needed. Another component of the z/OS operating system is the workload manager. It controls access to system resources for the work executing on z/OS based on administrator-defined goals.

New storage technologies provide non-volatile storage devices with different access speeds. For example new devices such as Flash memories are faster than conventional slower DASD (direct access storage devices) or hard disk drives. Therefore the need for a suitable workload allocation arises.

Different state of the art documents are concerned with storage or memory allocation. Document US 2009/0019097 describes a system and method for memory allocation management. Memory allocation requests comprise parameters for indicating requirements including a priority, a mandatory status etc. Each of a plurality of memories, such as scratch memory, persistent memory, etc., is characterized by operating speed, capacity and suitability of application types. Memory allocations are optimized by examining the parameters and a memory map is generated.

Another state of the art document, U.S. Pat. No. 7,062,628, describes a method and apparatus for storage pooling and provisioning for journal based storage and recovery. A set of interconnected storage systems supporting different types of storage devices and different performance attributes are intelligently applied to process types, such as journal entries. The processes are ranked according to a predetermined priority ranking. The highest priority process is matched with available devices from storage pools that rank highest in the processes performance priority. The storage pools are ranked according to capacity, reliability, and access rate.

Document U.S. Pat. No. 6,760,910 describes a workload distribution management method to enhance shared resource access in a multi-system environment and to meet a common performance standard. The method comprises dynamically tracking use by a plurality of work classes of a plurality of resources in the multi-system. Each work class comprises at least one work unit. A system resource manager dynamically forms a plurality of sets of the shareable resources and dynamically associates each work class with a set of the shareable resources based on resources currently employed by the at least one work unit.

The problem is that new storage technologies provide non-volatile storage devices with different access speeds, for example, a Flash memory is faster than conventional slower DASD (direct access storage devices) or hard disk drives. To enable fast data processing, the time needed for moving pages from the auxiliary storage back to the central storage should be as short as possible. A complete replacement of the slower auxiliary storage devices with the faster ones may become too expensive. Therefore, an economic way to distribute pages over the storage devices with different access speeds is desired.

SUMMARY

The present invention provides a method for storage management that utilizes different access speeds of the storage mediums to its advantage.

More specifically, the present invention provides a method for storage management in a data processing system having a plurality of storage devices with different performance attributes and a workload. The workload is being associated with respective sets of data blocks to be stored in the plurality of storage devices. The method comprises the steps of dynamically determining performance requirements of the workload and dynamically determining performance attributes of the storage devices. The method further comprises the step of allocating data blocks to the storage devices depending on the performance requirements of the associated workload and the performance attributes of the storage devices.

Through the claimed method new storage technologies can be advantageously applied. The different access speeds provided by non-volatile storage devices, for example, a Flash memory being faster than conventional slower DASD (direct access storage devices) or hard disk drives can now be adequately allocated to the performance requirements of the workloads. For fast data processing requirements, the time needed for moving pages from the auxiliary storage back to the central storage can now be as short as possible.

In a further embodiment of the claimed invention the step of dynamically determining the performance requirements of the workload comprise the steps of monitoring performance of the workload and repeatedly determining whether the performance of the workload meets the performance requirements of the workload. The method further comprises the steps of changing performance requirements of the storage devices to be allocated to the monitored workload depending on the previous determining step.

This further embodiment of the invention constantly checks if a workload is performing within its performance requirements. If this is not the case, then the storage allocation is adjusted accordingly.

In a further embodiment of the claimed invention the method further comprises the steps of determining performance requirements of data blocks of the workload, determining a pattern of performance requirements of the data blocks of said workload and allocating data blocks of the workload to storage devices based on the pattern.

Determining the pattern of allocation of data block of a certain workload allows for the possibility of shortcutting the method. If the same workload for, which such a pattern has been determined, is repeated, then the pattern of storage allocation may be used on the data blocks of that workload.

In yet a further embodiment of the claimed invention the performance attributes of the plurality of storage devices comprise at least one of the following:

an access rate, a free storage capacity, and a reliability.

In a further embodiment of the claimed invention the data processing system comprises a central storage to store data blocks currently needed for executing the workload and wherein said storage devices are auxiliary storages to store data blocks not currently needed for executing the workload.

In a further embodiment of the claimed invention the plurality of storage devices comprise at least a fast storage device and a slow storage device, wherein the fast storage device has a higher access rate than the slow storage device.

In a further embodiment of the claimed invention the method further comprises the steps determining priorities for plural workloads, wherein critical workloads have a higher priority than non-critical workloads and allocating the workloads to the storage devices depending on the priority of the workloads.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE DRAWINGS

Preferred embodiments of the invention are illustrated in the accompanying figures. These embodiments are merely exemplary, i.e. they are not intended to limit the content and scope of the appended claims.

DETAILED DESCRIPTION

Figure 1:
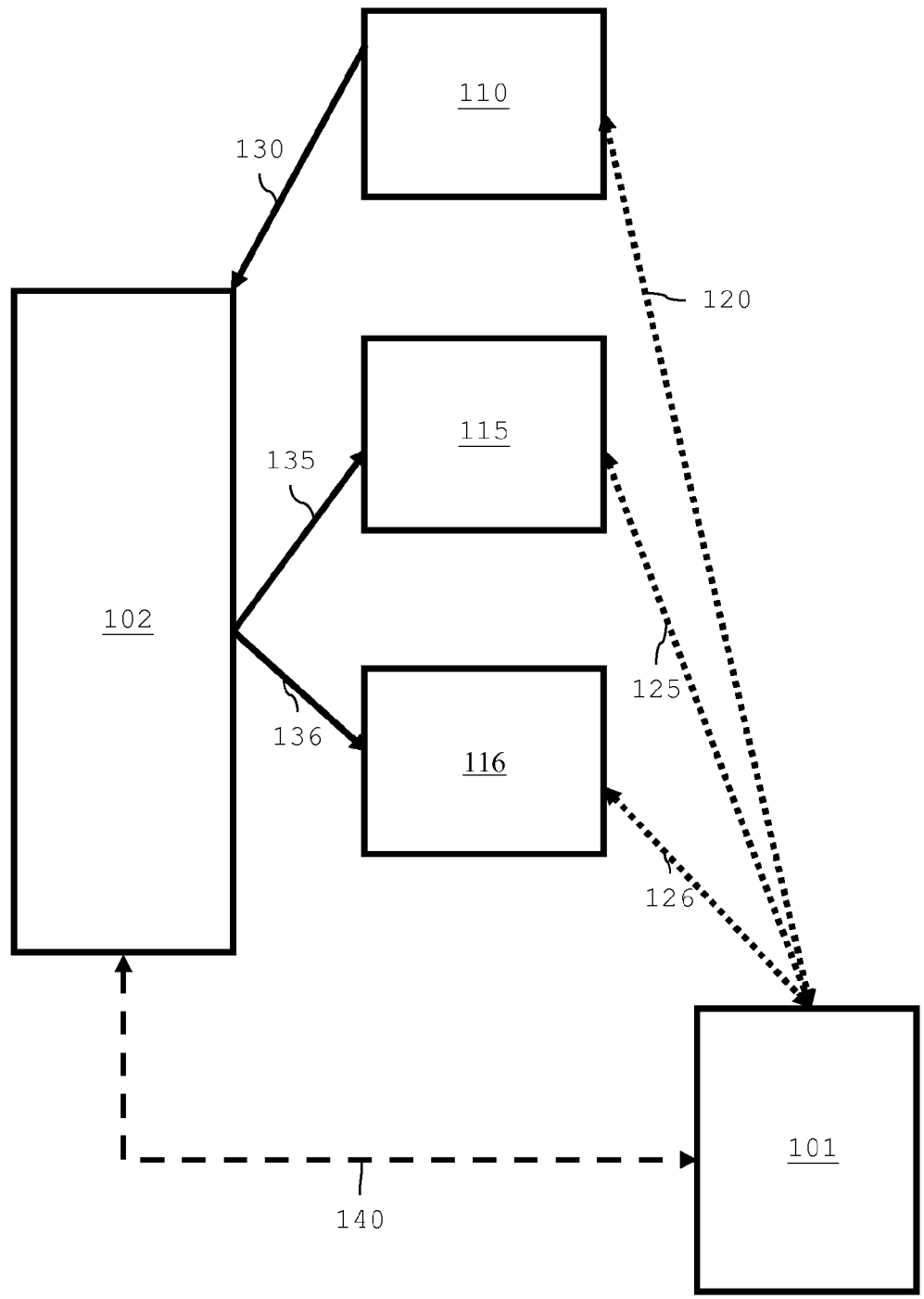
FIG. 1 shows the main components of an embodiment of the advanced auxiliary subsystem.

Shown in FIG. 1 are the components which comprise an advanced subsystem. The main components of an advanced subsystem are the workload manager 101 and the auxiliary storage manager 102. Also shown in FIG. 1 are the different storage devices, 110 is the central or real storage, 115 is the fast auxiliary storage, while 116 is the slow auxiliary storage.

The workload manager 101 classifies all incoming workload based on policies defined by the customer. The advanced auxiliary storage subsystem works with two performance requirements: importance (IMP) and storage critical (SC).

The workload manager uses 7 levels of importance. Importance 0 has the highest importance in the system and importance 6 (discretionary) has the lowest importance in the system.

The storage critical (SC) is an indicator of the importance of the data set to the functioning of the application. It has two settings, critical and non-critical. When the workload has the storage critical indicator set in the workload manager policy, then the workload will only lose storage to other work with equal or greater importance. If the importance of the other work is lower than that of the workload, then no changes will happen. The storage critical indicator is also used as part of the workload placement decision.

The workload manager 101 also works with a performance index (PI). The performance index is an indicator as to how well the workload meets the requirements in the workload manager 101 policy. PI>1 indicated that the workload doesn't meet the goals, while PI<1 indicates that the workload overachieves the goal. The workload manager 101 analyses the performance index and depending on the value the workload manager tries to determine the reasons for the particular PI value.

The workload manager 101 of the advanced auxiliary subsystem monitors the usage of the real 110 and auxiliary storages 115 and 116. This monitoring is represented in FIG. 1 by the lines 120, 125 and 126 respectively. The monitoring of the storages is necessary, because the current usage of each storage influences the decision made by the workload manager concerning the placement of new frames.

The auxiliary storage manager 102 is responsible for taking 130 a frame from the central/real storage 110 and store 135, 136 the frame in the auxiliary storage 115, 116. In the case of an advanced subsystem the placement 115, 116 is done based on decisions made by the workload manager 101. Prior to storing 135, 136 the frame, the auxiliary storage manager 102 communicates 140 with the workload manager 101. The auxiliary storage manager 102 passes the address space ID (ASID) of the frame owner to the workload manager 101.

The workload manager 101 has to answer such a request with a placement decision (slow 115 or fast 116 auxiliary storage). Then the auxiliary storage manager 102 stores 135, 136 the frame previously retrieved 130 from the real storage 110 in the auxiliary storage 115, 116 based on the decision of the workload manager 101.

Figure 2:
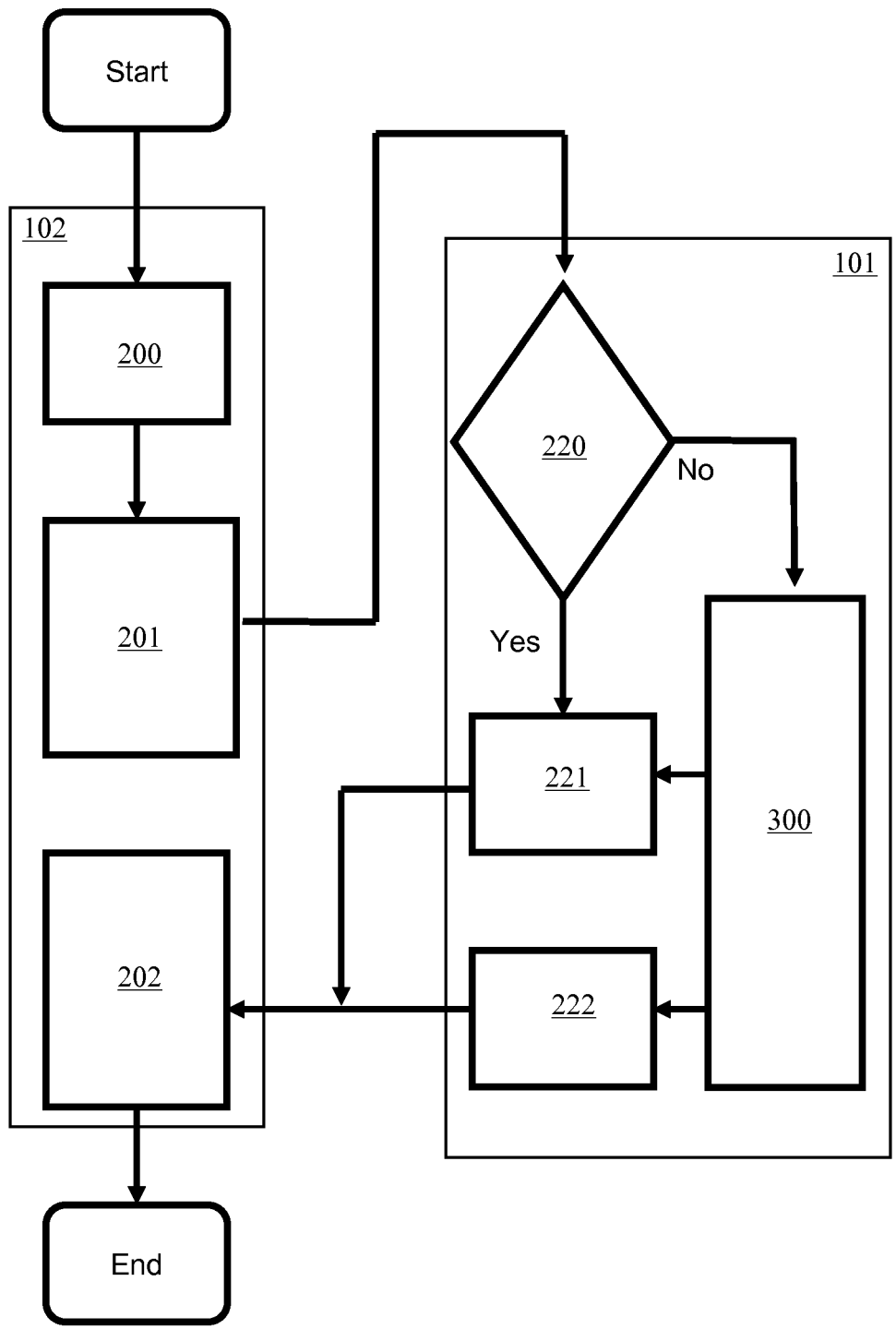
FIG. 2 shows in more detail the interaction between the auxiliary storage manager and the workload manager of a preferred embodiment of the invention.

Shown in FIG. 2 is a detailed flow of an auxiliary subsystem. When the auxiliary storage manager 102 retrieves a frame, the workload of the frame is determined 200 by analyzing the address space (ASID). In step 201 the auxiliary storage manager 101 creates a slot placement request and passes the slot placement request to the workload manager 101. Based on the current usage of the fast auxiliary storage 220, a quick decision 221 or a full decision 300, 221 or 222 is made by the workload manager. If more than 50% of the fast auxiliary storage 221 is free, the decision is always to place the slot on the fast auxiliary storage 221.

When the fast auxiliary storage is filled above 50%, then the "importance dependent" slot placement takes place in 300.

Figure 3:
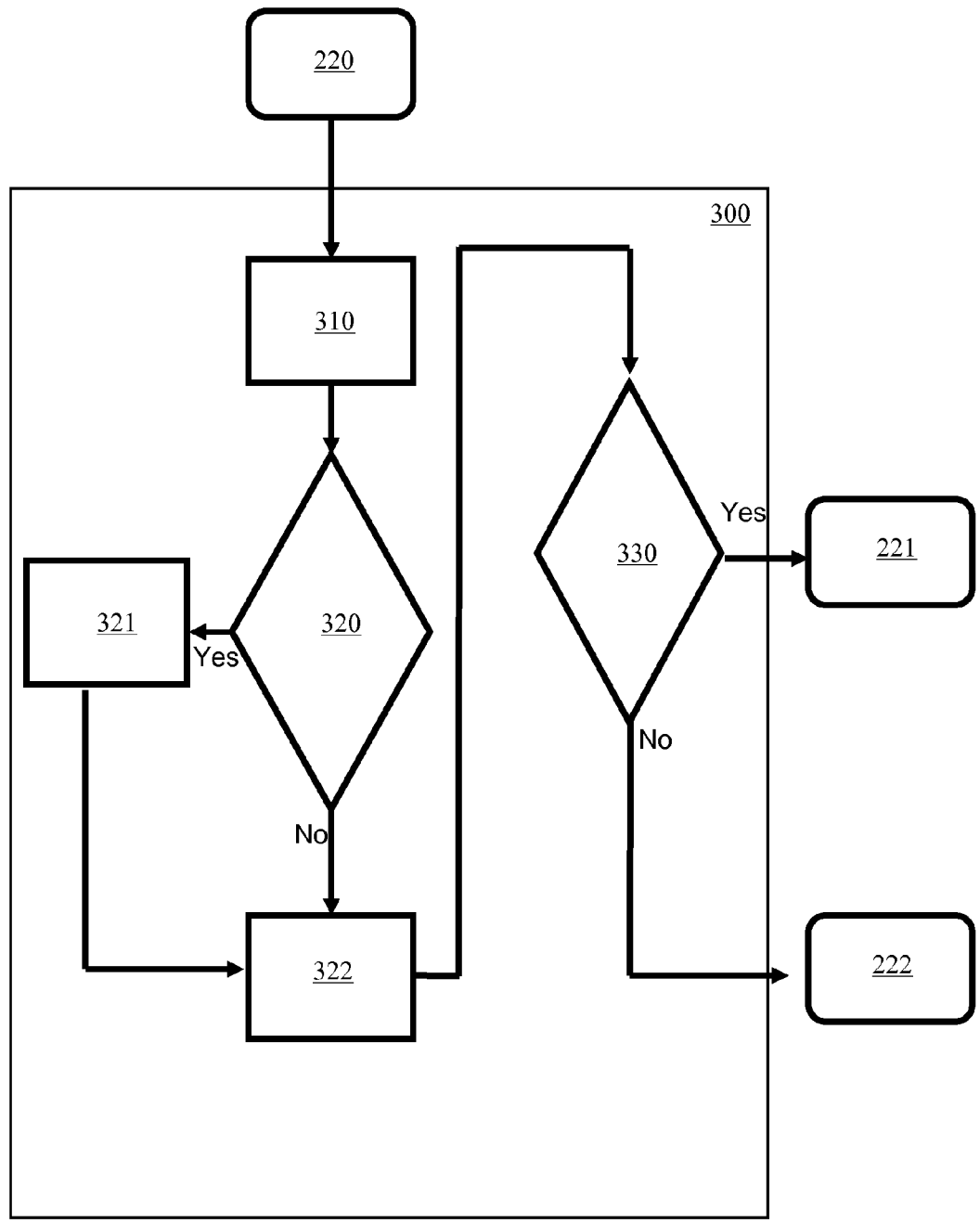
FIG. 3 shows a preferred embodiment of the workload manager decision logic.

Now referring to FIG. 3, the workload manager decision logic 300 converts 310 the passed ASID to the related importance (IMP) 310. This is done because all further processing is importance related. Then the workload manager logic 300 analyses in step 320 if the address space has the storage critical (SC) indicator set or if it has the Performance Index (PI)>1 and shows delays. If either case is true, then the advanced importance (AP_IMP) is set to the importance minus one in step 321. Otherwise the advanced importance (AP_IMP) is set to the importance in step 322. Finally in step 330 the current fast auxiliary storage usage (in percent) is compared with the allowed usage for the advanced importance (AP_IMP) of the slot. The allowed usage is in a table 490, which is rebuilt every 2 seconds by the workload manager 101 (see FIG. 4).

If the current auxiliary storage usage is higher than the allowed usage for the slot, then the workload manager returns to the auxiliary storage manager 101 with the command "Use slow auxiliary storage" in step 222. Otherwise it returns with the command "Use fast auxiliary storage" in step 221. Either command is then passed to the auxiliary storage manager through 140.

Figure 4:
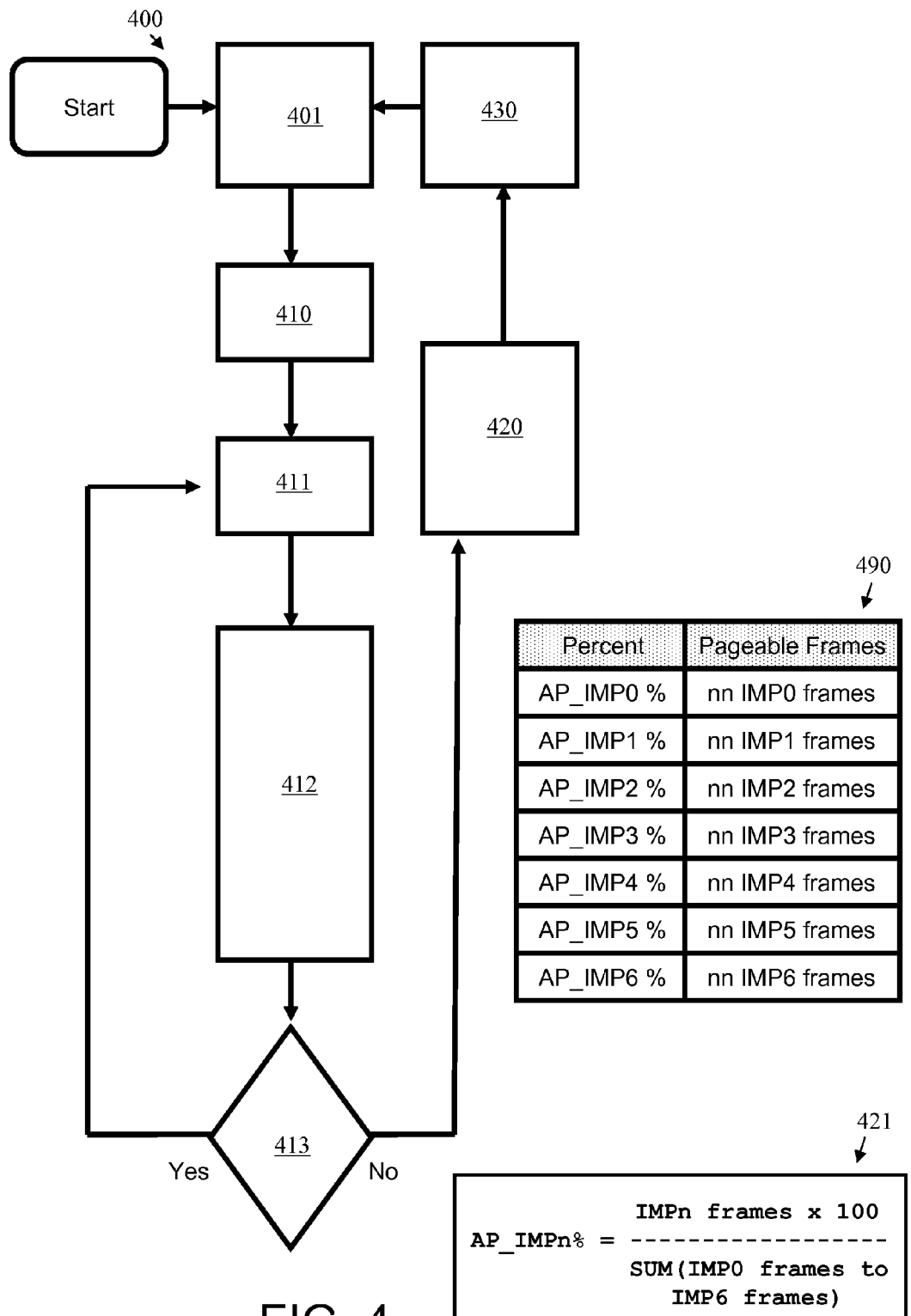
FIG. 4 shows a preferred embodiment of building an allowed usage table.

Shown in FIG. 4 is the building an allowed usage table 490. Every 2 seconds the workload manager 101 builds a new allowed usage table 490, which is a 7×2 matrix. The first column contains the allowed usage percentage by importance (AP_IMP) and the second column contains the number of pageable frames of all address spaces by importance.

The build of an allowed usage table process starts with clearing the pageable frame column. This is done in step 401 of FIG. 4. Then in step 410 the process starts at address space 1. The other address spaces are looped through in steps 411, 412 and 413. In particular, the following is done for all address spaces:

1 step 411 extracts the importance for the current address space.
2 step 412 increase the pageable frames count in the allowed usage table, by the pageable frames of the current address space. Also, the row in the allowed usage table is indexed by the importance. ($IMP_{index}$ frames=$IMP_{index}$ frames+ pageable frames of the current address space)
3 step 413 continues with the next address space until the last address space has been processed.

In step 410 the advanced importance (AP_IMP) for all 7 rows is calculated. This done by the following formula:

$$AP\_IMP_{row}=(IMP_{row} \text{ frames} \times 100)/\text{SUM}(IMP0 \text{ frames to } IMP6 \text{ frames})$$

Finally in step 430 the process waits 2 seconds and restarts the rebuilding the allowed usage table after the 2 seconds.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

REFERENCE SIGNS 101 workload manager
102 auxiliary storage manager
110 real storage
115 auxiliary storage fast
116 auxiliary storage slow
120 monitoring real storage
125 monitoring auxiliary storage fast
126 monitoring auxiliary storage slow
130 auxiliary storage manager receiving (stealing) frame
135 auxiliary storage manager storing frame to auxiliary storage slow
136 auxiliary storage manager storing frame to auxiliary storage fast
140 communication
200 steal frame and identify ASID
201 request frame placement decision and pass ASID
202 process stolen frame as decided by the workload manager
220 auxiliary storage (fast) usage <50%
221 use fast auxiliary storage
222 use slow auxiliary storage
300 workload manager decision logic
310 convert ASID to related IMP
320 (SC=on) or (PI>1 and delay)
321 AP_IMP=IMP-1
322 AP_IMP=IMP
330 auxiliary storage (fast) usage <allowed usage for AP_IMP
400 start
401 clear pageable frame colon in allowed usage table
410 select 1. address space
411 convert ASID to IMP
412 increase the IMP related frame count in the allowed usage table by number of pageable frames from the current address space
413 more address spaces
420 calculate the IMPn % in the allowed usage table for all importances
421 advanced importance calculation
430 schedule next allowed usage update table after 2 seconds
490 allowed usage table

The invention claimed is:

1. A method for storage management in a data processing system having a plurality of storage devices with different performance attributes and a workload, said workload being associated with respective sets of data blocks to be stored in said plurality of storage devices, said method comprising the steps of:
dynamically determining performance requirements of said workload, wherein the step of dynamically determining performance requirements of said workload includes converting an address space ID of a frame stored in a central storage to an importance and setting an advanced importance for the frame based on the importance, and wherein the frame stored in the central storage is to be stored in an auxiliary storage comprising one or more fast auxiliary storage devices and one or more slow auxiliary storage devices;
dynamically determining performance attributes of said storage devices, wherein the step of dynamically determining performance attributes of said storage devices includes building an allowed usage table for the one or more fast auxiliary storage devices, and wherein the allowed usage table contains a plurality of allowed fast auxiliary storage usage entries, each associated with one of a plurality of levels of advanced importance; and
allocating data blocks to said storage devices depending on the performance requirements of the associated workload and the performance attributes of the storage devices, wherein the step of allocating data blocks to said storage devices includes comparing a current fast auxiliary storage usage and an allowed fast auxiliary storage usage entry contained in the allowed usage table associated with a level of advanced importance corresponding to the advanced importance set for the frame and, if the current fast auxiliary storage usage is less than the allowed fast auxiliary storage usage entry, allocating the frame to the one or more fast auxiliary storage devices.

2. The method according to claim 1, wherein the step of dynamically determining the performance requirements of the workload further comprises the steps of:
monitoring performance of said workload;
repeatedly determining whether the performance of said workload meets the performance requirements of said workload, and
changing performance requirements of the storage devices to be allocated to the monitored workload depending on the previous determining step.

3. The method according to claim 1, further comprising the steps of:
determining performance requirements of data blocks of said workload;
determining a pattern of performance requirements of said data blocks of said workload; and
allocating data blocks of said workload to storage devices based on said pattern.

4. The method according to claim 1, wherein said performance attributes of said plurality of storage devices comprise at least one of the following:
an access rate,
a free storage capacity, and
a reliability.

5. The method according to claim 1,
wherein said data processing system comprises a central storage to store data blocks currently needed for executing, and
wherein said storage devices are auxiliary storages to store data blocks not currently needed.

6. The method according to claim 1, wherein said plurality of storage devices comprise a fast storage device and a slow storage device, said fast storage device having a higher access rate than said slow storage device.

7. The method according to claim 1, further comprising the steps of:
determining priorities for plural workloads, wherein critical workloads have a higher priority than non-critical workloads, and
allocating the workloads to said storage devices depending on the priority of said workloads.

8. The method according to claim 1,
wherein the free storage space of the fast storage device is checked,
and wherein data blocks are allocated to said fast storage device if the free storage space of said fast storage device is above a predetermined threshold.

9. An auxiliary storage system, the system comprising:
a plurality of storage devices;
an auxiliary storage manager; and a workload manager;

wherein said auxiliary storage manager and said workload manager dynamically determine performance requirements of a workload by converting an address space ID of a frame stored in a central storage to an importance and setting an advanced importance for the frame based on the importance, wherein the frame stored in the central storage is to be stored in an auxiliary storage comprising one or more fast auxiliary storage devices and one or more slow storage devices;

wherein said workload manager dynamically determines performance attributes of said storage devices by building an allowed usage table for the one or more fast auxiliary storage devices, wherein the allowed usage table contains a plurality of allowed fast auxiliary storage usage entries, each associated with one of a plurality of levels of advanced importance; and wherein said auxiliary storage manager allocates data blocks to said storage devices depending on the performance requirements of the associated workload and the performance attributes of the storage devices by comparing a current fast auxiliary storage usage and an allowed fast auxiliary storage usage entry contained in the allowed usage table associated with a level of advanced importance corresponding to the advanced importance set for the frame and, if the current fast auxiliary storage usage is less than the allowed fast auxiliary storage usage entry, allocating the frame to the one or more fast auxiliary storage devices.

10. The system according to claim 9, wherein said auxiliary storage manager and said workload manager:
monitor performance of said workload;
repeatedly determine whether the performance of said workload meets the performance requirements of said workload, and
change performance requirements of the storage devices to be allocated to the monitored workload depending on the previous determining step.

11. The system according to claim 9, wherein said auxiliary storage manager and said workload manager:
determine performance requirements of data blocks of said workload;
determine a pattern of performance requirements of said data blocks of said workload; and
allocate data blocks of said workload to storage devices based on said pattern.

12. The system according to claim 9, wherein said system comprises a central storage,
wherein the central storage device comprises the means to store data blocks currently needed for executing the workloads, and
wherein said storage devices are auxiliary storages, wherein the auxiliary storage devices comprise the means to store data blocks not currently needed.

13. The system according to claim 9, wherein said plurality of storage devices comprise a fast storage device and a slow storage device, said fast storage device having a higher access rate than said slow storage device.

14. The system according to claim 9, wherein said auxiliary storage manager and said workload manager:
determine priorities for plural workloads, wherein critical workloads have a higher priority than non-critical workloads, and
allocate the workloads to said storage devices depending on the priority of said workloads.

15. A computer program product comprising a computer usable non-transitory storage medium including computer usable program code, wherein the computer usable program code is adapted to execute the method of claim 1.

16. A computer program product for storage management in a data processing system having a plurality of storage devices with different performance attributes and a workload, said workload being associated with respective sets of data blocks to be stored in said plurality of storage devices, the computer program product comprising:
a plurality of executable instructions provided on a non-transitory computer readable storage medium that is a tangible medium, wherein the executable instructions, when executed by at least one processor in a programmable data processing apparatus, cause the programmable data processing apparatus to perform the steps of:
dynamically determining performance requirements of said workload, wherein the step of dynamically determining performance requirements of said workload includes converting an address space ID of a frame stored in a central storage to an importance and setting an advanced importance for the frame based on the importance, and wherein the frame stored in the central storage is to be stored in an auxiliary storage comprising one or more fast auxiliary storage devices and one or more slow auxiliary storage devices;
dynamically determining performance attributes of said storage devices, wherein the step of dynamically determining performance attributes of said storage devices includes building an allowed usage table for the one or more fast auxiliary storage devices, and wherein the allowed usage table contains a plurality of allowed fast auxiliary storage usage entries, each associated with one of a plurality of levels of advanced importance; and
allocating data blocks to said storage devices depending on the performance requirements of the associated workload and the performance attributes of the storage devices, wherein the step of allocating data blocks to said storage devices includes comparing a current fast auxiliary storage usage and an allowed fast auxiliary storage usage entry contained in the allowed usage table associated with a level of advanced importance corresponding to the advanced importance set for the frame and, if the current fast auxiliary storage usage is less than the allowed fast auxiliary storage usage entry, allocating the frame to the one or more fast auxiliary storage devices.

* * * * *